Aug. 28, 1934. L. M. GOLDSMITH Re. 19,289
ELECTRICAL GENERATING SYSTEM
Original Filed June 6, 1928
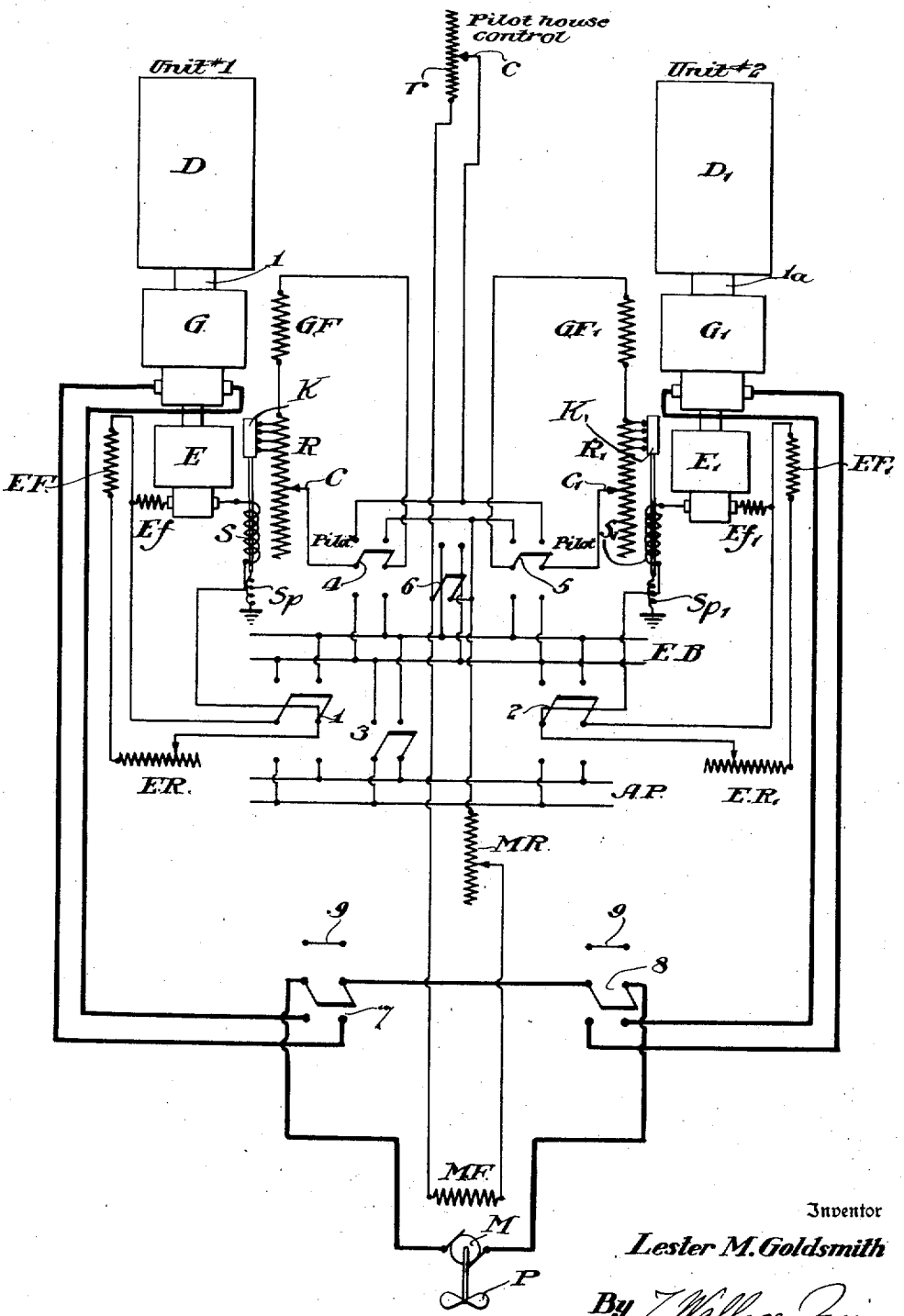
Inventor
Lester M. Goldsmith
By T. Wallace Finn
His Attorney Reissued Aug. 28, 1934

Re. 19,289

UNITED STATES PATENT OFFICE 19,289

ELECTRICAL GENERATING SYSTEM

Lester M. Goldsmith, Philadelphia, Pa., assignor to The Atlantic Refining Company, Philadelphia, Pa., a corporation of Pennsylvania Original No. 1,777,668, dated October 7, 1930, Serial No. 283,264, June 6, 1928. Application for reissue September 20, 1932, Serial No. 634,020

20 Claims. (Cl. 172—8)

My invention relates to electrical generating systems, particularly systems adapted to be utilized in the electrical propulsion of ships or other vehicles.

In accordance with my invention, in a current generating system in which two or more generators, specifically a main generator and an exciter therefor, are driven from a common source, for example, a Diesel engine, as the electrical load upon one of the generators, specifically the exciter, is varied, changing the total mechanical load upon the common driving source, the electrical load of the other or main generator is varied by changing its voltage to give a compensating effect to maintain the load upon the engine substantially constant and of a magnitude at which the efficiency of the system is high.

Further in accordance with my invention, I prefer to utilize two or more units, as above described, each comprising a main generator, an exciter, and a driving means therefor, and I control the field excitation of one or more of the main generators by the exciter of another unit by and in accordance with load upon the auxiliary generator of the same unit or units. More specifically, in the preferred embodiment of my invention, the main generators, connected in series, are utilized to supply current to the propulsion motor of a ship.

My invention further resides in the system hereinafter described and claimed.

For an understanding of my invention and for an illustration of one of the various forms it may take, reference is to be had to the accompanying drawing in which:

The figure is a diagrammatic view of a generating system embodying my invention.

Referring to the drawing, the generators G and E are driven by the same prime mover D, which, for example, may be a Diesel engine, as by having their rotors mounted on or carried by shaft 1 thereof. In series with the shunt field GF of generator G is a resistance R along which slides the manually adjustable contact C to vary the field excitation of generator G and hence its voltage.

The winding S of a relay having a contact member K movable to vary the effective magnitude of resistance R is included in the output circuit of the generator E which may be utilized to excite the field of generator G or for other purposes hereinafter described. Generator E may be a compound machine having the series field Ef and the shunt field EF in series with which is connected the adjustable resistance or field rheostat ER. For convenience the above group of elements will be hereinafter referred to as unit 1 and the substantially similar arrangement comprising the Diesel engine or equivalent D1, generators G1 and E1, as unit 2.

The exciters or auxiliary generators E and E1 may be connected by switches 1 and 2 respectively, either to the exciter bus bars EB or to the auxiliary power bus bars AP. Ordinarily, a single exciter is utilized to energize the fields of both generators G and G1 in which event switch 1 or 2 is thrown to its upper position connecting the desired exciter to the exciter bus bars EB and the other switch is left open or may be thrown to its down position connecting the other exciter to the auxiliary power bus bars AP. However, a single auxiliary generator E or E1 may be used to excite either or both generators G and G1 and in addition to supply auxiliary power by throwing switch 3, connecting the auxiliary power bus bars AP to the exciter bus bars EB in its upper position. The shunt field circuits of either or both the generators G and G1 may be connected directly across the exciter bus bars EB by throwing the respective switch 4 or 5 to its down position, or to the bus bars EB when switch 6 is in its closed position and switches 4 and/or 5 in lower position, through the adjustable resistance *r* along which slides the manually adjusted contact *c* to vary the field excitation of the generators and hence of their voltages.

In the system illustrated, the generators G and G1 are normally connected in series and supply constant current at variable voltage to the armature of a motor M which drives for example, the propeller P of a ship. By adjustment of contact *c* along resistance *r*, the pilot of the ship, when either or both switches 4 and 5 are in their upper position, is enabled directly and nicely to control its speed. The speed of motor M may also be controlled, as from the engine room of the ship, by adjustment of resistance MR connected in series with the field MF thereof across the exciter bus bars EB through switch 6. The speed of the motor and hence of the ship may also be varied by the shunt field rheostat ER or ER1 of the auxiliary generator which is supplying the field exciting current.

Hithertofore when a single exciter was used to energize the fields of two or more units, substantially as shown, the other auxiliary generators or exciters were permitted to run idle. As the auxiliary generators were usually of considerable capacity, as one-tenth or more of that of the associated main generator driven by the same prime mover, the load upon the prime mover was considerably decreased and to a point at which the efficiency of the prime mover and hence of the unit was low. In the system described, when the exciter E, for example, is disconnected and permitted to run idle, the contact K, due to the force exerted by spring Sp which is under compression, is held in the upper position, as shown in the drawing, and therefore short-circuits a portion of the resistance R to increase the strength of current flowing through shunt field GF and therefore of the voltage of generator G with the result that the electrical load of the generator G and of the mechanical load upon the prime mover D is increased, preferably to an extent equal to the load which auxiliary generator E would otherwise have imposed upon the prime mover D. The total power available to drive motor M is also increased, increasing the speed of the ship, and maintaining the efficiency of the system high. Although the mechanical load on both prime movers may be equal, as when they are substantially similar, the distribution of load upon generators G and G1, is determined by the selection of the exciting generator as above described.

As indicated, the contact K of the relay may be adapted to assume several different positions for various strengths of current through solenoid S which acts to pull said contact downwardly against the force exerted by the compression spring Sp, thereby to vary the effective magnitude of resistance R in steps. As the load varies upon the auxiliary or exciting generator of either unit, the voltage of the main generator of the same unit and hence the load thereon is varied in an opposite sense.

When necessary or desirable, a single unit may be utilized to propel the ship, by throwing either switch 7 or 8 to its upper position cutting out of circuit the other generator and re-establishing the circuit to the motor through a conductive bridging strap 9.

It will be understood that the number of units may be increased, that the number of generators driven from the same source may be varied, and that the specific manner and means of effecting control of the main generator voltage for varying loads upon the associated auxiliary or exciting generator may be other than that shown and described without departure from the spirit and scope of my invention.

What I claim is:

1. A system comprising two or more generators, a common prime mover therefor, load circuits for said generators, and means responsive to changes in magnitude of the load of one or more of said generators to vary in an opposite sense the magnitude of the load of another or other of said generators to maintain substantially constant the total load upon their said common prime mover.

2. A system comprising two or more generators, a common driving means therefor, load circuits for said generators, and means responsive to changes in magnitude of the load of one or more of said generators to vary in an opposite sense the voltage of another or other of said generators.

3. A system comprising two or more generators, a common driving means therefor, load circuits for said generators, and means responsive to changes in magnitude of the load of one or more of said generators to vary the field excitation of another or other of said generators to vary the voltage thereof in opposite sense.

4. A system comprising two or more generators, a common driving means therefor, load circuits for said generators, and means responsive to changes in magnitude of the load of one or more of said generators to vary in an opposite sense the magnitude of the load of another or other of said generators and to an extent substantially compensating for the change of load of said one or more generators.

5. A system comprising a generator, an exciter, common driving means therefor, load circuits for said generators, and means responsive to changes in magnitude of the load of said exciter to vary the voltage of said first generator in a sense and to an extent to maintain the load upon said driving means substantially constant.

6. A system comprising a generator, a load circuit in which said generator is connected, an adjustable resistance whose magnitude determines the field excitation thereof, a second generator, a load circuit therefor, a common driving means for said generators, and current responsive means in the output circuit of said second generator determining the effective magnitude of said resistance to proportion the load delivered by said first generator to its load circuit.

7. A system comprising a generator, an exciter for energizing the field windings thereof, a common driving means for said generator and exciter, load circuits for said generator and exciter, a resistance determining the magnitude of field energizing current, and current responsive means included in the output circuit of said exciter varying the effective magnitude of said resistance.

8. A plurality of generating units each comprising one or more generators and a driving source therefor, a common load circuit for said generators, an exciter driven by one of said sources, a load circuit for said exciter including field windings of generators of different units, and means to distribute the load of said circuit between said generators comprising load-responsive means included in the output circuit of said exciter to vary the field excitation of a generator having the same driving source.

9. A plurality of generating units each comprising a generator, an exciter and a substantially constant speed driving source therefor, a load circuit for the generator of each unit, a load circuit for the exciter of each unit, means to effect energization of the fields of said generators by a selected exciter, and means to increase the voltage of the generators having the same driving sources as the other exciters for increasing their respective loads comprising relays in the load circuits of said exciters.

10. A vehicle propulsion system comprising a plurality of generating units each comprising a generator, an exciter and a driving source therefor, a propelling motor, a circuit including said motor and said generators in series, a load circuit for the exciter of each unit, means to effect energization of the fields of said generators by a selected exciter, and means to increase the power supplied to said motor comprising current-responsive means in the load circuits of the other of said exciters controlling the field-excitation of the generator of the same units.

11. A vehicle propulsion system comprising a plurality of generating units each comprising a generator, an exciter and a driving source therefor, a propelling motor, a circuit including said motor and said generators in series, a load circuit for the exciter of each unit, means to effect energization of the fields of said generators by a selected exciter, switching means to connect the other exciters to an auxiliary power circuit, and means to maintain the load upon each of said driving sources substantially constant comprising current-responsive means in the load circuits of said exciters controlling the voltage of the generator of the respective units.

12. In an arrangement comprising two or more systems each comprising at least two generators and a prime mover therefor, the method which comprises exciting the fields of at least one generator of each system from another of said generators, supplying power to a common circuit by said generators having separately excited fields, and controlling the voltage of one generator of said generators supplying power to a common circuit in accordance with the magnitude of the load upon a generator having the same prime mover.

13. A system comprising a generator, a load circuit therefor, an exciter, a separate load circuit therefor, a common driving means for said generator and exciter, and means for varying the power delivered by said generator to its load circuit comprising current-responsive means in said exciter load circuit for varying the field excitation of said generator.

14. A plurality of units each comprising a generator and a driving source therefor, an exciter driven by one of said sources, a load circuit for said generators, a load circuit for said exciter comprising field windings of said generators, and current-responsive means in said exciter load circuit for varying only the field excitation of the generator driven by the same driving source as said exciter.

15. An electric power system comprising a motor, a plurality of generators driven by said motor, a plurality of load circuits for said generators, means for connecting said generators to said load circuits, and means operating substantially simultaneously with the means for connecting one of said generators to its load circuit for decreasing the output of another of said generators.

16. An electric power system comprising a motor, a plurality of generators driven by said motor, a plurality of load circuits, switches for connecting said generators to said load circuits, and means depending on the movement of one of said switches, associated with one of said generators for decreasing the load capacity of another of said generators when said switch is operated to complete a load circuit.

17. In a ship propulsion system, a generating unit comprising a prime mover, a main generator and an anxiliary generator driven by said prime mover, a load circuit, a main switch for connecting said auxiliary generator to said load circuit, and means associated with said main switch for decreasing the excitation of said main generator when said main switch is closed.

18. An electric power system comprising a prime mover, a plurality of generators driven by said prime mover, a plurality of load circuits, switches for connecting said generators to said load circuits, and means automatically responsive to closure of one of said switches for varying the load upon one of said generators inversely as the load upon another generator is varied, whereby to maintain the load upon said prime mover substantially constant.

19. An electric power system which comprises a prime mover, a plurality of generators driven by said prime mover, load circuits for said generators, means for connecting each generator to a load circuit, and means for decreasing the load upon one of said generators when the load upon another or other of said generators is increased, thereby to maintain substantially constant the total load upon the prime mover.

20. An electric power system which comprises a prime mover, a plurality of generators driven by said prime mover, load circuits for each of said generators, means for connecting said load circuits to said generators, and means for reducing the excitation on one of said generators when the load upon another or other of said generators is increased, thereby to maintain substantially constant the total load upon the prime mover.

LESTER M. GOLDSMITH.